a2 United States Patent
Kuechenmeister et al.

(10) Patent No.: US 8,513,561 B2
(45) Date of Patent: Aug. 20, 2013

(54) SYSTEM FOR DETECTING WELD NUT ORIENTATION

(75) Inventors: Joseph Kuechenmeister, Crown Point, IN (US); Grady Gipson, Schererville, IN (US)

(73) Assignee: Ford Global Technologies, LLC, Dearborn, MI (US)

( * ) Notice: Subject to any disclaimer, the term of this patent is extended or adjusted under 35 U.S.C. 154(b) by 1060 days.

(21) Appl. No.: 12/467,359

(22) Filed: May 18, 2009

(65) Prior Publication Data

US 2010/0288737 A1 Nov. 18, 2010

(51) Int. Cl.
- B23K 11/00 (2006.01)
- B23K 9/12 (2006.01)
- B23K 9/28 (2006.01)
- B23K 9/24 (2006.01)

(52) U.S. Cl.
USPC .................. 219/117.1; 219/86.51; 219/86.41; 219/93; 219/119

(58) Field of Classification Search
USPC .................. 219/117.1, 86.51, 86.41, 93, 119
See application file for complete search history.

(56) References Cited

U.S. PATENT DOCUMENTS

| 2,101,156 | A | * | 12/1937 | Payne | 53/83 |
| 2,172,261 | A | * | 9/1939 | Rippl | 91/443 |
| 2,793,283 | A | * | 5/1957 | Wellman | 219/86.51 |
| 4,447,697 | A | * | 5/1984 | Dunne et al. | 219/86.41 |
| 4,605,833 | A | * | 8/1986 | Lindberg | 219/56.22 |
| 5,895,584 | A | * | 4/1999 | Sakota | 219/86.24 |
| 6,355,900 | B1 | * | 3/2002 | Sherman | 219/117.1 |
| 6,576,859 | B2 | * | 6/2003 | Cabanaw | 219/119 |
| 7,301,118 | B2 | * | 11/2007 | Mallette | 219/86.51 |
| 2003/0213779 | A1 | * | 11/2003 | Hidaka | 219/93 |

* cited by examiner

Primary Examiner — Joseph M Pelham
Assistant Examiner — Gyounghyun Bae
(74) Attorney, Agent, or Firm — Shook Hardy & Bacon, LLP

(57) ABSTRACT

A weld gun system for detecting the orientation of a weld nut relative to the metallic component to which it is to be welded prior to welding is disclosed. The system includes a lower electrode having a weld location pin, an upper electrode having a central circular recess formed therein, a fluid supply fluidly connected to the central circular recess of the upper electrode, and a pressure switch also fluidly connected to the central circular recess of the upper electrode. Once the weld nut is captured between the electrodes the fluid flows from the fluid supply into the central circular recess of the upper electrode. If the weld nut is in proper orientation the fluid continues to flow to the pressure switch and the weld occurs. If the weld nut is not in proper orientation the fluid does not flow to the pressure switch but is instead vented from the central circular recess and the weld does not occur.

18 Claims, 3 Drawing Sheets

SYSTEM FOR DETECTING WELD NUT ORIENTATION

TECHNICAL FIELD

The disclosed invention relates generally to weld gun systems for resistance welding of weld nuts to a metallic object. More particularly the disclosed invention relates to a weld gun system for detecting the orientation of a weld nut relative to the metallic component to which it is to be welded prior to welding.

BACKGROUND OF THE INVENTION

It is a common manufacturing practice to secure nuts directly to sheet metal pieces through a welding process. In the manufacture of motor vehicles today, there are virtually hundreds of applications for such "weld nuts" including various forms of brackets, air bag supports, door parts and many others.

In general the weld nut is resistance welded to a metallic component by the weld gun. The weld nut is loaded onto a lower electrode. An upper electrode is moved into contact with the weld nut. A very high current is applied to the electrodes and the weld nut is welded to the metallic component.

A variety of welding assemblies have been utilized for the production of weld nuts. One of the most common assemblies employs upper and lower welding units and a retractable steel locating pin. See, for example, U.S. Pat. No. 2,731,535 issued to Grey. As discussed by Grey, in operation, a sheet metal piece with a preformed aperture is loaded on top of the lower welding unit such that the aperture is aligned directly over the locating pin recessed within the lower welding unit. The locating pin is then extended through the aperture of the sheet metal piece to capture a nut fed from a weld nut feeder positioned above and to one side of the locating pin. The nut is then centered about the locating pin over the aperture by the force of gravity. The upper welding unit then descends over the nut and a voltage differential is applied between the upper and lower welding units to fuse the nut to the sheet metal piece. Finally, the upper welding unit is withdrawn, the locating pin is retracted into the lower welding unit, and the sheet metal piece is removed from the welding assembly.

Significantly, this conventional type of welding assembly is known by those skilled in the art to suffer from a problem with respect to weld nut orientation. Occasionally when the weld nut is released from the feeder onto the component to which it is to be attached, the weld nut drops face up such that the weld projections face away from the component to which the weld nut is to be welded, resulting in the wrong orientation of the weld nut. In such instance the weld nut cannot be properly attached to the component.

In response to the occasional problem of incorrect orientation, a fiber optic sensing system has been developed which measures the distance traveled by the nut weld pin. This distance is compared with pre-programmed set point values. If the distance measured agrees with the pre-programmed set point values, then a weld occurs. If the distance measured disagrees with the pre-programmed set of values, then a weld will not occur.

While representing an improvement in the state of the art regarding weld nut orientation, the known fiber optic systems suffer from poor quality and are costly to purchase and to maintain.

As in so many areas of component assembly technology, there is room in the art of weld nut orienting detection systems which will help to avoid some of the limitations of known designs.

SUMMARY OF THE INVENTION

The present invention provides a weld gun system for detecting the orientation of a weld nut relative to the metallic component to which it is to be welded prior to welding that avoids the problems of known orientation detection systems. The system includes a lower electrode having a weld location pin, an upper electrode having a central circular recess formed therein, a fluid supply fluidly connected to the central circular recess of the upper electrode, and a pressure switch also fluidly connected to the central circular recess of the upper electrode. Both the fluid supply and the pressure switch may be directly fitted to the upper electrode or may be remotely connected thereto by means of fluid lines.

The lower electrode has an upper surface which, when in use, contacts the metallic component to which the weld nut is to be welded. The upper electrode has a lower surface which, when in use, contacts the outer side (the side without the weld projections).

In operation, the weld nut locating pin of the lower electrode is fitted through the opening of the component to which the weld nut is to be attached. Thereafter the weld nut is automatically deposited onto the weld nut locating pin such that the central hole of the weld nut fits over the weld nut locating pin.

Thereafter the bottom surface of the upper electrode is rested against the weld nut. A predetermined volume of regulated gas is sent from the air supply into the central circular recess of the upper electrode.

At this stage there are two possible outcomes. If the bottom surface of the upper electrode is indeed in contact with the projection-less outer side of the weld nut, then a seal is formed such that no or little gas is allowed to pass therebetween, instead being forced to the pressure switch. The switch, sensing that a predetermined amount of gas is present, closes, thus causing a weld to occur. This is the situation with a properly aligned weld nut.

Conversely, if the bottom surface of the upper electrode is instead moved into contact with the inner side (the projection side) of the weld nut, the compressed gas generated by the air supply simply passes between the projections, the bottom surface of the upper electrode and the inner side of the weld nut. In such a circumstance very little if any gas pressure is sensed by the pressure switch. The switch does not close and the weld does not occur.

The system of the disclosed invention is efficient, inexpensive, and durable, requiring little maintenance for proper and virtually continuous operation.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
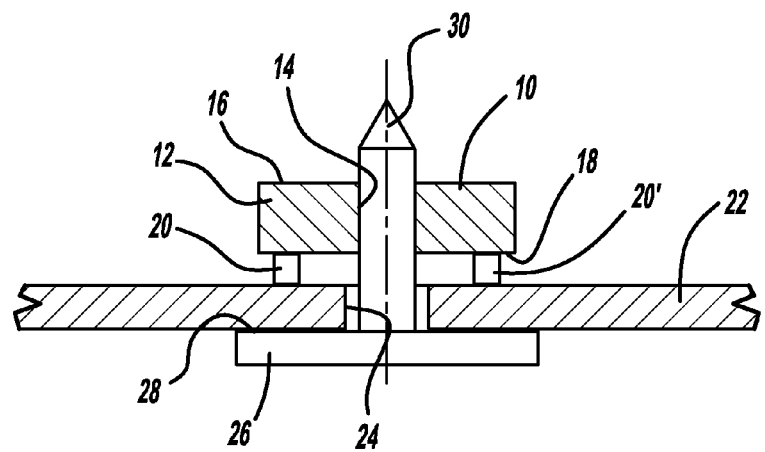
FIG. 1 is a partial cross-sectional view of a metallic component having a weld nut in proper orientation on the weld pin of a lower electrode.

In the following figures, the same reference numerals will be used to refer to the same components. In the following description, various operating parameters and components are described for different constructed embodiments. These specific parameters and components are included as examples and are not meant to be limiting.

With reference to FIG. 1, a conventional weld nut 10 is shown. The weld nut 10 includes a weld nut body 12 and a central hole 14. The weld nut 10 further includes an outer surface 16 and an inner surface 18.

A plurality of weld projections is formed on the weld nut inner surface 18. As is known in the art, the weld nut projections are generally formed on the inner surface of the weld nut in an array around the central hole of the weld nut. The shape, placement and number of weld nut projections are all variable. Accordingly, the weld nut 10 is shown for illustrative purposes only and is not intended as being limiting. As illustrated in FIG. 1, two weld nut projections 20 and 20' are shown, but it is to be understood that the placement, number and shape of the projections can be varied without deviating from the intent and purpose of the disclosed invention.

A metallic component 22 is provided to which the weld nut 10 is to be welded. The metallic component 22 may be any of several components, including brackets, panels, and supports. The disclosed invention can be used wherever weld nuts need to be welded to a metallic component.

The metallic component 22 includes an opening 24. A weld gun lower electrode 26 is provided having a flat upper surface 28. For the system of the disclosed invention to be effective, at least a portion of the flat upper surface 28 must be in direct contact with at least a portion of the metallic component 22 as is known in the art.

Attached to the lower electrode 26 is a weld nut locating pin 30. The weld nut locating pin 30 is generally of a cylindrical construction having a constant diameter. The weld nut locating pin 30 is passed through the opening 24 of the metallic component 22 and extends beyond the metallic component 22.

As illustrated, while the opening 24 of the metallic component 22 is considerably larger than the diameter of the weld nut locating pin 30, the central hole 14 of the weld nut 10 is only slightly larger than the diameter of the weld nut locating pin 30, thus forming a relatively tight seal between the central hole 14 and the weld nut locating pin 30.

Figure 2:
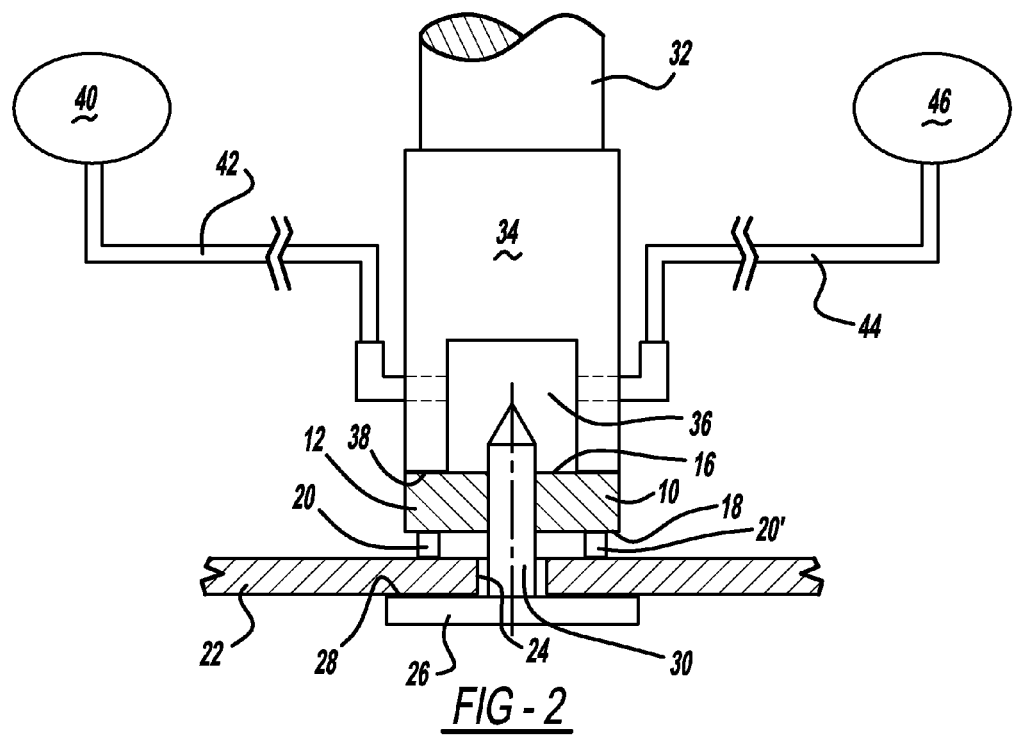
FIG. 2 is a partial cross-sectional view of the arrangement of FIG. 1 showing in addition the upper electrode of the disclosed invention in its welding position.

Referring to FIG. 2, the weld nut 10 is shown in relation to the lower electrode 26 as in FIG. 1. Once the weld nut 10 is in place on the weld nut locating pin 30 a weld gun upper adapter 32 supporting a weld gun upper electrode 34 is moved into position relative to the weld nut 10. The upper electrode 34 includes a central circular recess 36 large enough to readily accommodate at least a portion of the weld nut locating pin 30. The upper electrode 34 includes a flat bottom surface 38.

A fluid supply 40 is provided and is in fluid communication with the central circular recess 36 of the upper electrode 34. The fluid supply itself is preferably a gas such as air. A fluid supply line 42 is provided to convey the fluid from the fluid supply 40 to the central circular recess 36. The pressure of the fluid supply 40 may be any of a variety of values, but preferably the fluid is regulated at about 40 PSI.

A pressure switch 46 is provided and is also in fluid communication with the central circular recess 36 of the upper electrode 34. A pressure switch fluid line 44 is provided to convey fluid from the central circular recess 36 to the pressure switch 46. The pressure of the pressure switch 46 may be any of a variety of values, but preferably the switch is set to close at 20 PSI.

When the upper electrode 34 is in position on a properly oriented weld nut 10 as shown in FIG. 2, the flat bottom surface 38 generally presses flush against the outer surface 16 of the weld nut 10. With the upper electrode 34 in this position, a quantity of fluid, normally air, is released from the fluid supply 40 and enters the central circular recess 36 via the fluid supply line 42. Because of the seal formed between the flat bottom surface 38 of the upper electrode 34 and the outer surface 16 of the weld nut 10, the pressurized fluid is forced through the central circular recess 36, into and through the fluid line 44, and to the pressure switch 46. If the requisite amount of pressure is received by the pressure switch 46, the switch 46 closes and the weld of the weld nut 10 to the component 22 occurs as is known in the art.

Figure 3:
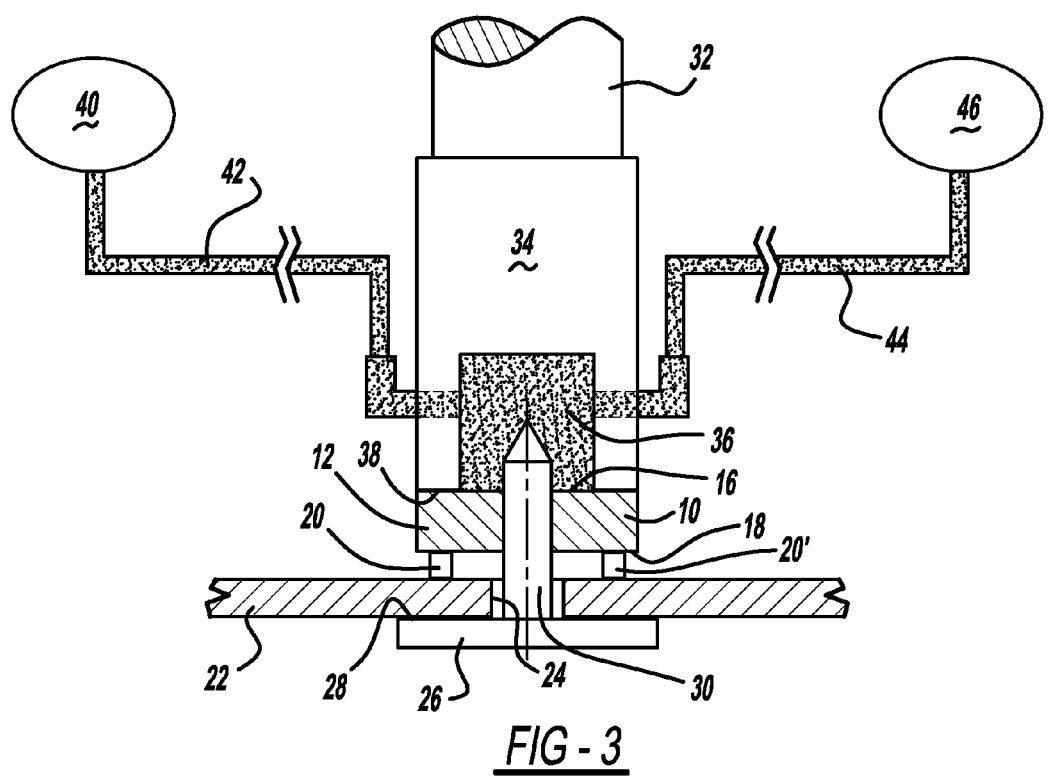
FIG. 3 is a view similar to that of FIG. 2 but showing a pressurized gas flowing from the fluid supply into the central circular recess of the upper electrode and to the pressure switch.
Figure 4:
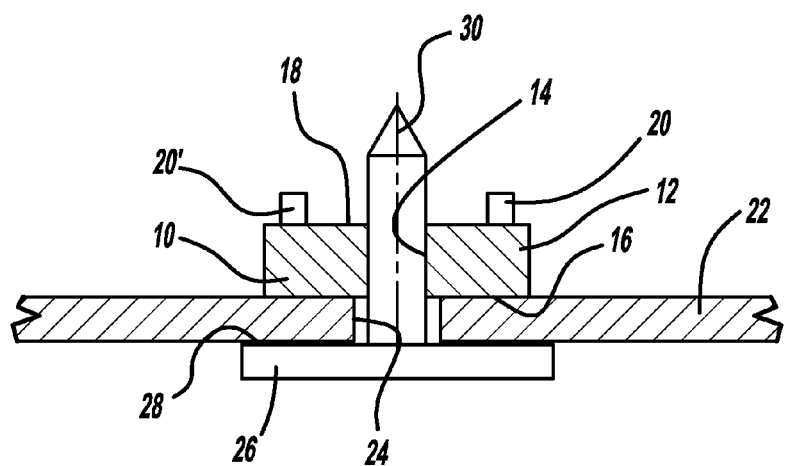
FIG. 4 is a partial cross-sectional view of a metallic component having a weld nut in improper orientation on the weld pin of a lower electrode.
Figure 5:
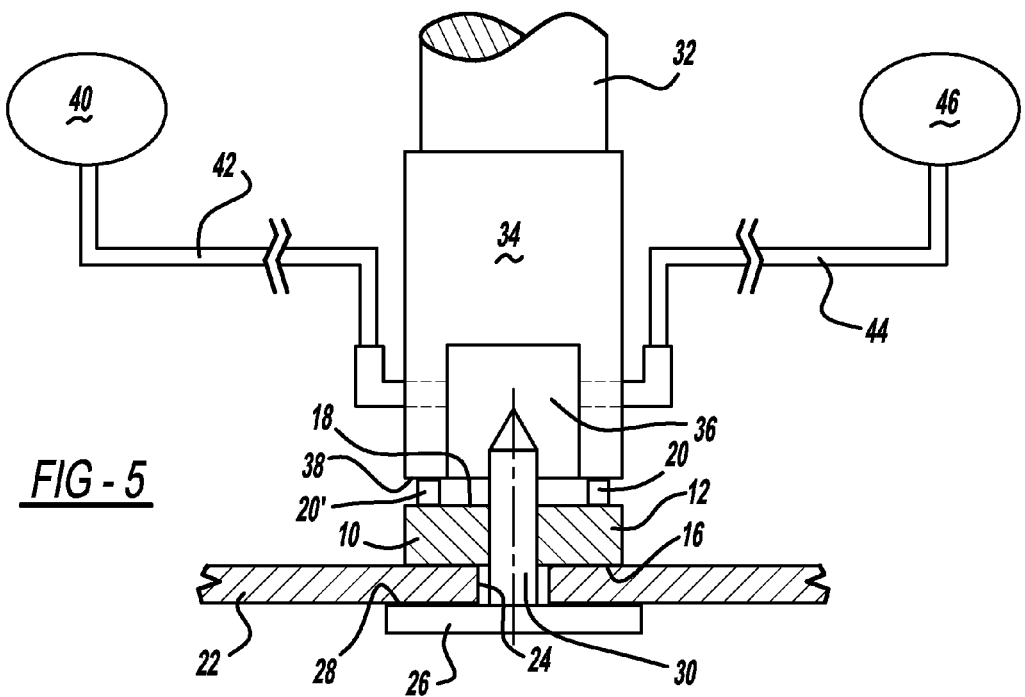
FIG. 5 is a partial cross-sectional view of the arrangement of FIG. 4 and showing in addition the upper electrode of the disclosed invention in its welding position.
Figure 6:
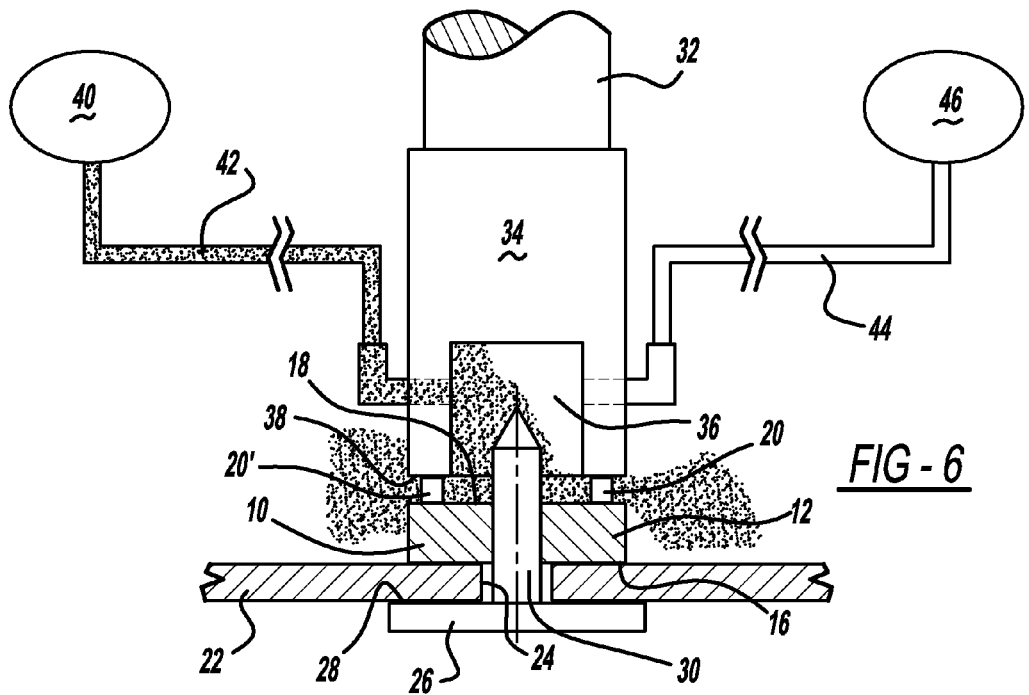
FIG. 6 is a view similar to that of FIG. 5 but showing a pressurized gas flowing from the fluid supply into the central circular recess of the upper electrode and venting between the upper electrode and the inverted weld nut.

Accordingly, FIGS. 1 through 3 illustrate how the apparatus and method of the disclosed invention operate if the weld nut 10 is in proper orientation. FIGS. 4 through 6 illustrate how the apparatus and method of the disclosed invention operate if the weld nut 10 is inverted or is not in its proper orientation.

FIG. 4 illustrates the same arrangement as shown in FIG. 1 with the exception that the weld nut 10 is shown in its inverted position, the result of the weld nut 10 being placed incorrectly. In such circumstance the weld projections 20 and 20' extend upwards.

FIG. 5 illustrates placement of the upper electrode 34 relative to the weld nut 10. The flat bottom surface 38 of the upper electrode 34 is in contact with the ends of the weld projections 20 and 20'. As a result, and as shown in FIG. 6, when the pressurized fluid flows from the fluid supply 40 to the central circular recess 36 via the fluid line 42, the fluid vents out of the central circular recess 36 by passing between the weld projections 20 and 20', the flat bottom surface 38, and the weld nut outer surface 16. Accordingly very little if any fluid is received by the pressure switch 46. Thus the pressure switch 46 does not close and the weld does not occur.

Other embodiments of the disclosed invention may include plural fluid supplies, plural pressure switches, alternative placement for the fluid supply and pressure switch, and an alternate configuration for the central circular recess.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A system for confirming orientation of a weld nut relative to a component to which the weld nut is to be welded, the system comprising:
    a lower electrode;
    a weld nut locating pin attached to said lower electrode;
    an upper electrode having a recess formed therein for receiving fluid;
    a fluid supply fluidly connected to said recess of said upper electrode; and
    a fluid pressure switch fluidly connected to said recess of said upper electrode, said switch being movable to a closed position if a requisite amount of fluid pressure is detected.

2. The system of claim 1 wherein said recess of said upper electrode receives at least a portion of said weld nut locating pin.

3. The system of claim 1 further including a fluid line fitted between said fluid supply and said recess of said upper electrode.

4. The system of claim 1 further including a fluid line fitted between said pressure switch and said recess of said upper electrode.

5. The system of claim 1 wherein said upper electrode has a lower surface for contacting the weld nut.

6. The system of claim 1 wherein said lower electrode has an upper surface for contacting the component.

7. The system of claim 1 wherein said fluid supply is a gas supply.

8. A system for confirming the correct orientation of a weld nut relative to a component to which the weld nut is to be welded, the system comprising:
    a lower electrode;
    a weld nut locating pin attached to said lower electrode;
    an upper electrode, said upper electrode having a central recess to loosely receive at least a portion of said weld nut locating pin;
    a fluid supply fluidly connected to said central recess of said upper electrode; and
    a pressure switch fluidly connected to said central recess of said upper electrode, whereby a fluid seal is formed between the weld nut and the upper electrode if the weld nut is in its correct orientation.

9. The system of claim 8 further including a fluid line fitted between said fluid supply and said central circular recess of said upper electrode.

10. The system of claim 8 further including a fluid line fitted between said pressure switch and said central recess of said upper electrode.

11. The system of claim 8 wherein said upper electrode has a lower surface for contacting the weld nut.

12. The system of claim 8 wherein said lower electrode has an upper surface for contacting the component.

13. The system of claim 8 wherein said fluid supply is a gas supply.

14. A method for confirming orientation of a weld nut relative to a component to which the weld nut is to be welded, the method comprising:
    forming an apparatus having a lower electrode, a weld nut locating pin attached to said lower electrode, an upper electrode, said upper electrode having a central recess to receive at least a portion of said weld nut locating pin, a fluid supply fluidly connected to said central recess of said upper electrode, and a pressure switch fluidly connected to said central recess of said upper electrode
    placing the weld nut on said weld nut locating pin;
    placing said upper electrode into contact with the weld nut; and
    causing a fluid to flow from said fluid supply into said central recess of said upper electrode, whereby if the weld nut is properly oriented then fluid passes from the central recess to the pressure switch and whereby if the weld nut is not properly oriented then fluid passes between said upper electrode and the weld nut.

15. The method of claim 14 wherein said apparatus further includes a fluid line fitted between said fluid supply and said central recess of said upper electrode.

16. The system of claim 14 wherein said apparatus further includes a fluid line fitted between said pressure switch and said central recess of said upper electrode.

17. The system of claim 14 wherein said upper electrode of said apparatus has a lower surface for contacting the weld nut.

18. The system of claim 14 wherein said lower electrode of said apparatus has an upper surface for contacting the component.

* * * * *